(12) United States Patent
Tang

(10) Patent No.: US 8,982,867 B2
(45) Date of Patent: *Mar. 17, 2015

(54) SYSTEM AND METHOD FOR WIRELESS COMMUNICATIONS

(71) Applicant: FutureWei Technologies, Inc., Plano, TX (US)

(72) Inventor: Yang Tang, San Diego, CA (US)

(73) Assignee: Futurewei Technologies, Inc., Plano, TX (US)

(*) Notice: Subject to any disclaimer, the term of this patent is extended or adjusted under 35 U.S.C. 154(b) by 131 days.

This patent is subject to a terminal disclaimer.

(21) Appl. No.: 13/656,338

(22) Filed: Oct. 19, 2012

(65) Prior Publication Data

US 2013/0058205 A1 Mar. 7, 2013

Related U.S. Application Data

(63) Continuation of application No. 12/548,278, filed on Aug. 26, 2009, now Pat. No. 8,300,616.

(51) Int. Cl.
*H04B 7/26* (2006.01)
*H04L 1/00* (2006.01)
*H04L 25/02* (2006.01)
*H04L 25/03* (2006.01)

(52) U.S. Cl.
CPC ...... *H04L 25/0204* (2013.01); *H04L 25/03343* (2013.01); *H04L 1/0003* (2013.01); *H04L 1/0009* (2013.01)
USPC ............................ 370/342; 370/204; 375/260

(58) Field of Classification Search
CPC ................................................. H04L 25/03949
See application file for complete search history.

(56) References Cited

U.S. PATENT DOCUMENTS

| 4,140,510 A | 2/1979 | Scholze et al. |
| 4,838,941 A | 6/1989 | Hill |

(Continued)

FOREIGN PATENT DOCUMENTS

| CN | 1452365 A | 10/2003 |
| WO | WO 99/45669 | 9/1999 |
| WO | WO 2007/070313 A2 | 6/2007 |

OTHER PUBLICATIONS

First Chinese Office Action of Chinese Application No. 200980131989.7, mailing date: Nov. 5, 2012, 12 pages. (Partial English Translation).
Huawei, "SU-MIMO Codebooks," IEEE 802.16 Broadband Wireless Access Working Group, http://ieee802.org/16, Aug. 25, 2008, pp. 1-9.
Clerckx, B., et al., "Practical Codebook Design for Limited Feedback Spatial Multiplexing," IEEE International Conference on Communications, 2008, pp. 3982-3987.

(Continued)

*Primary Examiner* — Jianye Wu
(74) *Attorney, Agent, or Firm* — Slater & Matsil, L.L.P.

(57) ABSTRACT

A system and method for wireless communications is provided. A method for operating in a communications network includes receiving a codebook, the codebook includes a plurality of codewords, and determining if the codebook satisfies a constant modulus property. The method also includes in response to determining that the codebook does not satisfy the constant modulus property, converting the codebook into a codebook satisfying the constant modulus property, and storing the codebook satisfying the constant modulus property. The method further includes storing the codebook in response to determining that the codebook does satisfy the constant modulus property, and causing to transmit a transmission to a communications device, wherein the transmission is encoded using a codeword in the stored codebook.

21 Claims, 10 Drawing Sheets

(56) References Cited

U.S. PATENT DOCUMENTS

| | | | |
|---|---|---|---|
| 6,563,808 B1 | 5/2003 | Cox et al. | |
| 2004/0213705 A1 | 10/2004 | Blencoe et al. | |
| 2005/0002847 A1 | 1/2005 | Maroto-Valer et al. | |
| 2006/0092054 A1 | 5/2006 | Li et al. | |
| 2006/0111148 A1 | 5/2006 | Mukkavilli et al. | |
| 2006/0152276 A1 | 7/2006 | Barksdale | |
| 2007/0261947 A1 | 11/2007 | Geerlings et al. | |
| 2008/0049877 A1* | 2/2008 | Yu et al. | 375/340 |
| 2008/0094281 A1 | 4/2008 | Teng et al. | |
| 2008/0192717 A1* | 8/2008 | Kent et al. | 370/342 |
| 2008/0303699 A1* | 12/2008 | Zhang et al. | 341/67 |
| 2009/0003474 A1* | 1/2009 | Pan et al. | 375/260 |
| 2009/0274230 A1* | 11/2009 | Heath et al. | 375/260 |

OTHER PUBLICATIONS

Samsung, "Codebook based Precoding for 8 Tx Transmission in LTE-A," 3GPP TSG RAN WG1 Meeting, #54, R1-082887, Aug. 18-22, 2008, 2 pages, Jeju, Korea.

European Search Report, Applicant: FutureWei Technologies, Inc., Application No. 09810549.7-2415/2328670 PCT/US2009055099, Nov. 1, 2011, 10 pages.

International Search Report and the Written Opinion of the International Searching Authority, Applicant: Futurewei Technologies, Inc., International Application No. PCT/US09/55099, Nov. 5, 2009, 11 pages.

\* cited by examiner

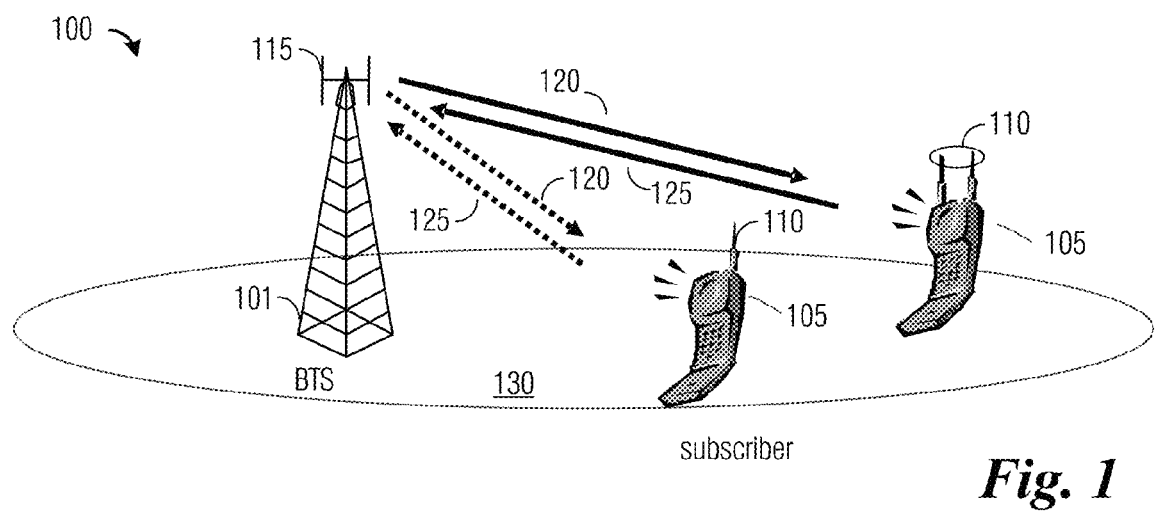
*Fig. 1*
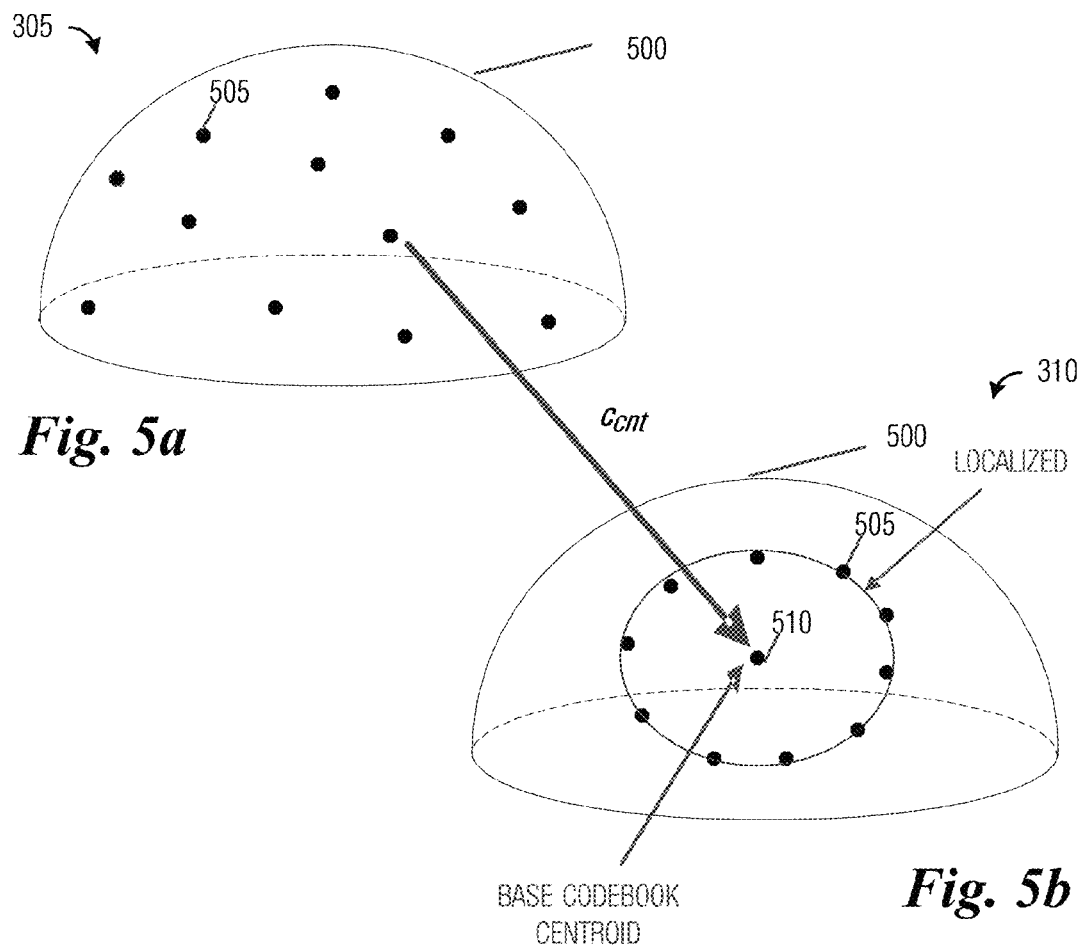
*Fig. 5a*
*Fig. 5b*

SYSTEM AND METHOD FOR WIRELESS COMMUNICATIONS

This application is a continuation of U.S. patent application Ser. No. 12/548,278, entitled "System and Method for Wireless Communications," filed on Aug. 26, 2009 and U.S. Provisional Application No. 61/092,043, filed on Aug. 26, 2008, entitled "Modulus Normalization for the Codebook Design," which applications are hereby incorporated herein by reference.

TECHNICAL FIELD

The present invention relates generally to wireless communications, and more particularly to a system and method for wireless communications using a constant modulus (CM) codebook.

BACKGROUND

Communication system capacity generally may be significantly improved when the transmitter has full or partial channel state information (CSI). CSI may be obtained by a transmitter via a reverse feedback channel between the transmitter and a receiver. To accommodate the limited feedback channel bandwidth, CSI normally is quantized into digital format at the receiver before being fed back to the transmitter. A codebook based algorithm generally is one of the most efficient ways to quantize the channel. A generic codebook may consist of multiple codewords. In general, the codeword is selected based on certain selection criteria and the corresponding codeword index is fed back from the receiver to the transmitter. The principles for codeword selection may be varied based on different precoding techniques.

One of the challenges of the codebook design is the balance between the feedback overhead and the quantization accuracy. Generally, the more codewords included in a codebook, the better the channel quantization accuracy. The large number of codewords, however, also means larger feedback load.

Another challenge of the codebook design is to cover a wide range of channel characteristics. For example, a correlated channel and an uncorrelated channel generally have very different properties and, therefore, come with different codebook design criteria.

Existing codebooks suffer significant challenges, however, including shortcomings in performance for both correlated and uncorrelated channels, and complexity involved in codeword searching and differential feedback. What is needed, then, is a codebook and method of using same to overcome these disadvantages in the prior art.

SUMMARY OF THE INVENTION

These and other problems are generally solved or circumvented, and technical advantages are generally achieved, by embodiments of a system and method for wireless communications using a constant modulus (CM) codebook.

In accordance with an embodiment, a method for operating in a communications network is provided. The method includes receiving a codebook, the codebook including a plurality of codewords, and determining if the codebook satisfies a constant modulus property. The method also includes in response to determining that the codebook does not satisfy the constant modulus property, converting the codebook into a codebook satisfying the constant modulus property, and storing the codebook satisfying the constant modulus property. The method further includes storing the codebook in response to determining that the codebook does satisfy the constant modulus property, and causing to transmit a transmission to a communications device. The transmission is encoded using a codeword in the stored codebook.

In accordance with another embodiment, a method for communications device operation in a communications network is provided. The communications network having a base station. The method includes computing an estimate of a communications channel between the communications device and the base station, quantizing the estimate with a first codebook, and transmitting information based on the quantized estimate to the base station. The first codebook satisfies a constant modulus property.

In accordance with another embodiment, a method for base station operation in a communications network is provided. The base station serving a communications node. The method includes receiving channel information from the communications node, extracting a codebook index from the channel information, reconstructing a channel estimate using the codebook index and a codebook, and causing to transmit a transmission to the communications node. The codebook satisfies a constant modulus property, and the transmission is precoded using the reconstructed channel estimate.

An advantage of an embodiment is that the use of a CM codebook in transmissions may help to avoid transmit power imbalance in multiple input, multiple output (MIMO) communications systems.

A further advantage of an embodiment is that the use of a CM codebook may also reduce computational complexity by decreasing the number of multiplications required in signal processing. By reducing the computational complexity, the computation load may be decreased, which may allow for the use of computationally less powerful, lower power consuming, and less expensive computing hardware in a communications device.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which:

FIG. 1 is a diagram of a wireless communication system;
FIG. 5a is a diagram of a base codebook;
FIG. 5b is a diagram of a localized codebook.

DETAILED DESCRIPTION OF ILLUSTRATIVE EMBODIMENTS

Figure 2A:
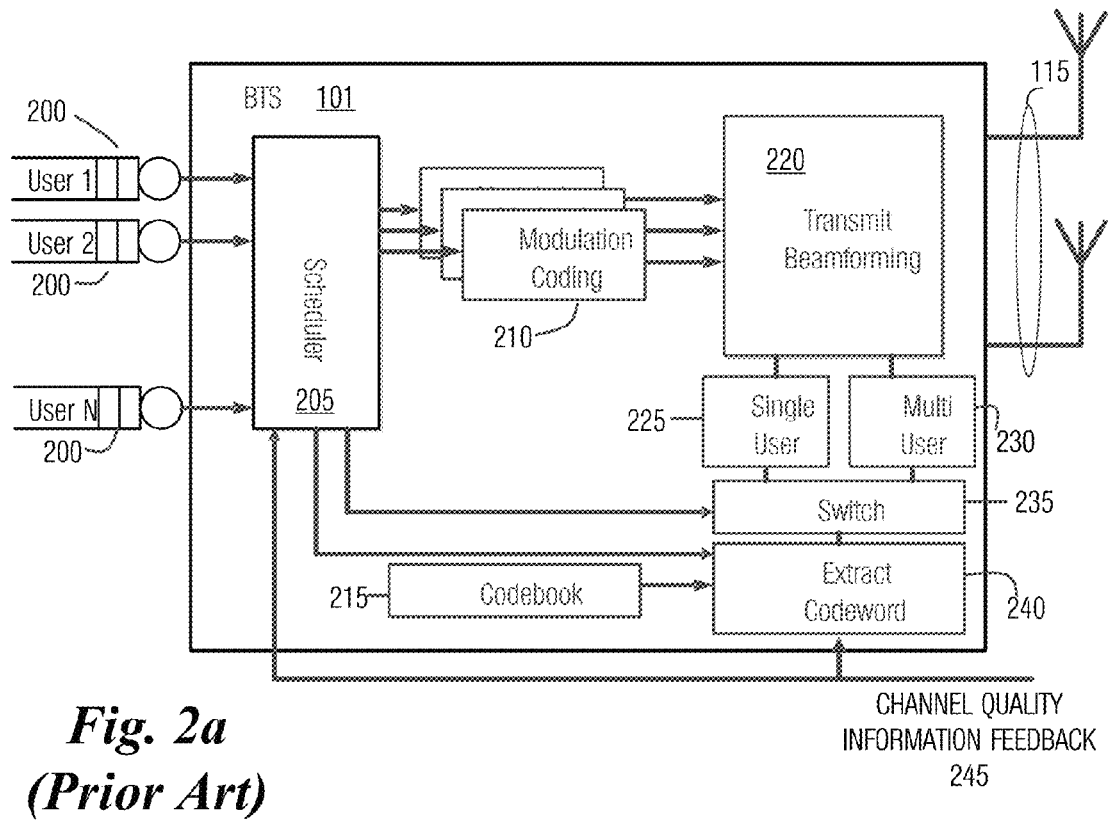
FIG. 2a is a diagram of a prior art BTS.

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a single user (SU) wireless communications system with two (2), four (4), and eight (8) transmit antennas, i.e., SU-MIMO. The invention may also be applied, however, to both SU-MIMO and multiple user (MU) MIMO wireless communications systems with an arbitrary number of transmit and receive antennas.

FIG. 1 illustrates a wireless communication system 100. Wireless communications system 100 includes a base transceiver station (BTS) 101 and a plurality of subscriber units 105, which may be mobile or fixed. BTS 101 and subscriber units 105 communicate using wireless communications. BTS 101 has a plurality of transmit antennas 115 while subscriber units 105 have one or more receive antennas 110. BTS 101 sends control information and data to subscriber units 105 through a downlink (DL) channel 120 while subscriber units 105 send control information and data to BTS 101 through uplink (UL) channel 125.

In general, a BTS, such as BTS 101, may also be referred to as a base station, a NodeB, and enhanced NodeB, and so forth. Similarly, a subscriber unit, such as subscriber units 105, may also be referred to as a mobile station, a user, a subscriber, a User Equipment, and so on.

Subscriber units 105 may send control information on UL channel 125 to improve the quality of the transmission on DL channel 120. BTS 101 may send control information on DL channel 120 for the purpose of improving the quality of uplink channel 125. A cell 130 is a conventional term for the coverage area of BTS 101. It is generally understood that in wireless communication system 100 there may be multiple cells corresponding to multiple BTSs.

FIG. 2*a* illustrates a prior art BTS 101. Data 200, in the form of bits, symbols, or packets for example, destined for a plurality of subscriber units being served may be sent to a scheduler 205, which may decide which subscriber units will transmit in a given time/frequency opportunity. Scheduler 205 may use any of a wide range of known scheduling disciplines in the literature including round robin, maximum sum rate, proportional fair, minimum remaining processing time, or maximum weighted sum rate. Generally scheduling decisions are based on channel quality information feedback 245 fed back from a plurality of subscriber units.

Data from subscriber units selected for transmission are processed by modulation and coding block 210 to convert the data to transmitted symbols. Modulation and coding block 210 may also add redundancy for the purpose of assisting with error correction and/or error detection. A modulation and coding scheme implemented in modulation and coding block is chosen based in part on information about the channel quality information feedback 245.

The output of modulation and coding block 210 may be passed to a transmit beamforming block 220, which maps the output (a modulated and coded stream for each subscriber unit) onto a beamforming vector. The beamformed outputs are coupled to antennas 115 through RF circuitry, which are not shown. The transmit beamforming vectors are input from a single user block 225 or a multi-user block 230.

Either beamforming for single user (subscriber unit) beamforming or multiple user (subscriber unit) beamforming may be employed, as determined by switch 235, based on information from scheduler 205 as well as channel quality information feedback 245. Part of each subscriber unit's channel quality information feedback includes an index to a codeword in codebook 215, corresponding to quantized channel information. The modulation/coding and beamforming may be repeated for all scheduled subscriber units based on the output from scheduler 205.

An extract codeword block 240 produces the quantized channel state information based on the index received from channel quality information feedback 245. Extract codeword block 240 may use the index to reference the codeword from codebook 215. The output of extract codeword block 240 is passed to switch 235 that forwards the information to either single user block 225 or multi-user block 230. Other information may also be passed to these blocks, for example a signal-to-interference-plus-noise ratio (SINR) estimate may be passed to the multi-user block 230 to improve its performance. Single user block 225 uses the output of extract codeword block 240 as the beamforming vector for the selected subscriber unit. Other processing may also be applied, such as interpolation in the case that orthogonal frequency division multiplexing (OFDM) modulation is employed.

Multi-user block 230 combines the codeword from codebook 215 and other information from multiple subscriber units to derive the transmit beamforming vectors employed for each subscriber unit. It may use any number of algorithms widely known in the literature including zero forcing, coordinated beamforming, minimum mean squared error beamforming, or lattice reduction aided precoding for example. Channel quality information feedback 245 may, for purposes of illustration, be in the form of quantized channel measurements, modulation, coding, and/or spatial formatting decisions, received signal strength, and signal-to-interference-plus-noise measurements, and so forth.

Figure 2B:
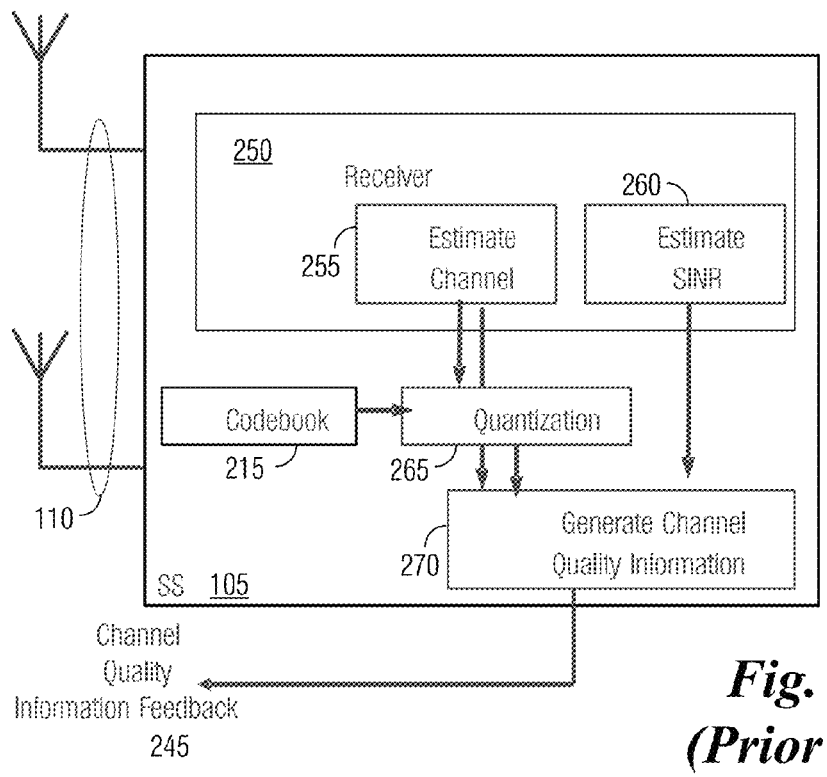
FIG. 2b is a diagram of a prior art subscriber unit.

FIG. 2*b* illustrates a prior art subscriber unit 105. Subscriber unit 105 may have one or a plurality of receive antennas 110, connecting through RF circuitry, not shown, to a receiver signal processing block 250. Some of the key functions performed by receiver signal processing block 250 may be channel estimation 255 and estimate signal-to-interference-plus-noise ratio (SINR) block 260. Channel estimation block 255 uses information inserted into the transmit signal in the form of training signals, training pilots, or structure in the transmitted signal such as cyclostationarity to estimate coefficients of the channel between BTS 101 and subscriber unit 105.

Channel state information is quantized in a codebook-based quantization block 265, which uses codebook 215 (the same codebook as codebook 215 of FIG. 2a) also available at BTS 101. The output of quantization block 265 may be the index of a codeword in codebook 215 that best corresponds to the channel state information. For example, the vector in codebook 215 that is closest to the estimated channel vector in terms of minimum subspace distance may be chosen, or the vector from codebook 215 that maximizes the effective SINR may be selected. The index of the codeword is provided to generate channel quality information block 270, which generates channel quality information feedback 245 from the index. The channel quality information feedback 245 may be used to aid scheduling and transmit beamforming, for example.

In prior art, the beamforming vector $f_u^{\#}$ chosen at the transmitter comes from a finite set of possible beamforming vectors $F=\{f_1, f_2, \ldots, f_N\}$, the coefficients of which may be from any number of codebooks known in the literature including Grassmannian codebooks, DFT codebooks, vector quantization codebooks, etc.

The size of the codebook is given by N and is sometimes given in bits $\log_2 N$. Prior art considers codebooks of size around 6 bits. The receiver selects the index of the best vector from the codebook at the receiver according to any number of codeword selection criteria. For example, quantization block 265 may compute the optimum index as $$k_u = \max_{n=1,2,\ldots,N} \|H_u f_n\|$$

and this index is incorporated into channel quality information feedback 245 by generate channel quality information message block 270. In another embodiment, quantization block 265 computes the dominant right singular vector of $H_u$ as v then computes the optimum index as $$k_u = \min_{n=1,2,\ldots,N} d(v, f_n)$$

using a subspace distance like the chordal distance. BTS 101 then extracts codeword block sets $f_u^{\#}=f_{k^*}$, basically the index received on the feedback channel is used to generate the beamforming vector used for transmission.

Now consider one embodiment of the multiple user transmission mode. For illustrative purposes suppose that $M_t=2$, $M_r=1$, and there are two subscriber units a and b chosen by scheduler 205. Suppose the transmit beamforming vectors are computed using the zero-forcing precoding methodology (described in T. Yoo, N. Jindal, and A. Goldsmith, Multi-Antenna Downlink Channels with Limited Feedback and User Selection, IEEE Journal Sel. Areas in Communications, Vol. 25, No. 7, pp. 1478-1491, September 2007, for example). The received signal at subscriber unit a after matched filtering and sampling may be written as $$y_a = H_a f_a^{\#} s_a + H_a f_b^{\#} s_b + v_a$$

where $y_a$ is the $M_r \times 1$ received signal vector (where $M_r$ is the number of receive antennas), $H_a$ is the $M_r \times M_t$ channel matrix (where $M_t$ is the number of transmit antennas at the BTS) between BTS 101 and subscriber unit a, $f_a^{\#}$ is the $M_t \times 1$ transmit beamforming vector designed for subscriber unit a, $f_b^{\#}$ is the $M_t \times 1$ transmit beamforming vector designed for subscriber unit b, $s_a$ is the symbol sent to subscriber unit a, $s_b$ is the symbol sent to subscriber unit b, and $v_a$ is the additive noise vector at subscriber unit a's receiver of dimension $M_r \times 1$.

A similar equation may be written for subscriber unit b and this equation may naturally be generalized to more than two subscriber units. In the case of $M_r=1$ the subscriber unit, may employ the same quantization method as described in the previous case to find an index for the quantized channel state in quantization block 265. Unlike the single user case, however, the subscriber unit may also send additional information like an estimate of the signal-to-interference-plus-noise (SINR) ratio that includes effects of quantization. The reason is that because quantized channel state information is used, and there is residual interference that should be accounted for. This may be estimated in generate channel quality information block 270 using any number of techniques known in the litereature.

BTS 101 uses the SINR information in scheduler 205 to select the subscriber units for transmission and also to estimate their transmission rates for modulation and coding block 210. With zero forcing precoding, multi-user block 230 may compute the transmit beamforming vector by inverting the matrix $[f_a, f_b]$, and normalizing the columns to produce the beamforming vectors $[f_a^{\#}, f_b^{\#}]$. Because of the effects of residual interference, multiuser systems as is well known in the prior art (see for example Yoo. Et. al.) require large codebook sizes, i.e., N may be large (for example, on the order of 4,096 or more). A major challenge is that it is very difficult to perform the quantization in quanitization block 265 and generate the reconstruction in extract codeword block 240 when the codebook size is large. The problem is overcome in the embodiments.

Figure 3A:
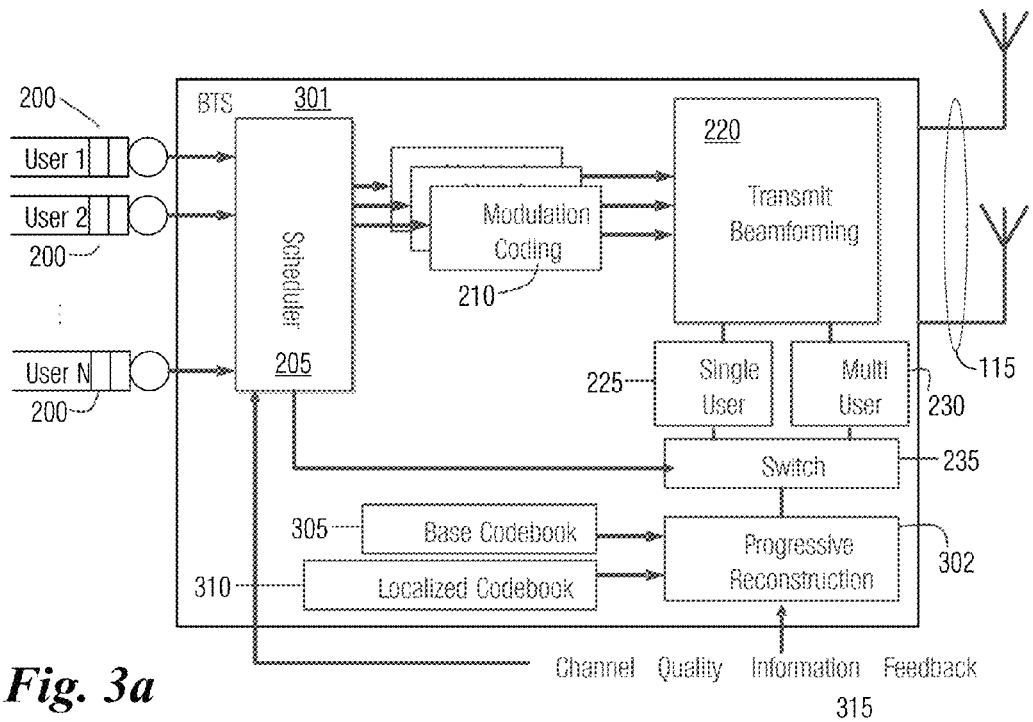
FIG. 3a is a diagram of a BTS.

FIG. 3a illustrates a BTS 301. Data 200, in the form of bits, symbols, or packets for example, destined for a plurality of subscriber units being served are sent to a scheduler 205, which decides which subscriber units will transmit in a given time/frequency opportunity. Data from subscriber units selected for transmission are processed by modulation and coding block 210 to convert to transmitted symbols and add redundancy for the purpose of assisting with error correction or error detection. The modulation and coding scheme is chosen based in part on information about the channel quality information feedback 315.

The output of modulation and coding block 210 is passed to a transmit beamforming block 220, which maps the modulated and coded stream for each subscriber unit onto a beamforming vector. The beamformed outputs are coupled to antennas 115 through RF circuitry. The transmit beamforming vectors are input from single user block 225 or multi-user block 230. Either beamforming for a single user or multi-user beamforming may be employed, as determined by switch 235, based on information from scheduler 205 and channel quality information feedback 315. Part of each subscriber units' channel quality information feedback includes a new progressive feedback message that provides indices corresponding to progressively quantized channel information as described in the embodiments.

Progressive reconstruction block 302 uses the indices in channel quality information feedback 315 combined with a base codebook 305 and a localized codebook 310 to reconstruct a high-resolution estimate of the quantized channel state information. The output of progressive reconstruction block 302 is passed to switch 235 that forwards the information to either the single user block 225 or the multi-user block 230. Other information may also be passed to these blocks, for example a SINR estimate may be passed to the multi-user block 230 to improve its performance. Single user block 225 uses the output of progressive reconstruction block 302 as the beamforming vector for the selected user.

Multi-user block 230 combines the codeword and other information from multiple users to derive the transmit beamforming vectors employed for each subscriber unit. It may use any number of algorithms known in the literature including zero forcing, coordinated beamforming, minimum mean squared error beamforming, or lattice reduction aided precoding, for example.

Scheduler 205 may use any of the known scheduling disciplines in the literature including round robin, maximum sum rate, proportional fair, minimum remaining processing time, or maximum weighted sum rate; generally scheduling decisions are based on channel quality information feedback 315 received from the plurality of subscriber units. Scheduler 205 may decide to send information to a single subscriber unit via transmit beamforming or may decide to serve multiple subscriber units simultaneously through multiuser MIMO communication.

Modulation and coding block 210 may perform any number of coding and modulation techniques including quadrature amplitude modulation, phase shift keying, frequency shift keying, differential phase modulation, convolutional coding, turbo coding, bit interleaved convolutional coding, low density parity check coding, fountain coding; or block coding. The choice of modulation and coding rate in a preferred embodiment is made based on channel quality information feedback 315 in a preferred embodiment and may be determined jointly in the scheduler 205.

While not explicitly illustrated, it is obvious to those of ordinary skill in the art that OFDM modulation can be used. Further, any number of multiple access techniques could be used including orthogonal frequency division multiple access; code division multiple access; frequency division multiple access; or time division multiple access. The multiple access technique may be combined with the modulation and coding block 210 or the transmit beamforming block 220 among others.

Although the discussion focuses progressive reconstruction block 302 and the use of base codebook 305 and localized codebook 310, it is obvious to those of ordinary skill in the art that BTS 301 may also use a single codebook in place of multiple codebooks (base codebook 305 and localized codebook 310) without modification. For example, progressive reconstruction block 302 may use an index in channel quality information feedback 315 with just base codebook 305 to reconstruct an estimate of the quantize channel state information. The output of progressive reconstruction block 302 is passed to switch 235 that forwards the information to either the single user block 225 or the multi-user block 230. The remainder of BTS 301 may be as described above.

Channel quality information feedback 315 may, for purposes of illustration, be in the form of quantized channel measurements, modulation, coding, and/or spatial formatting decisions, received signal strength, and signal-to-interference-plus-noise measurements.

Figure 3B:
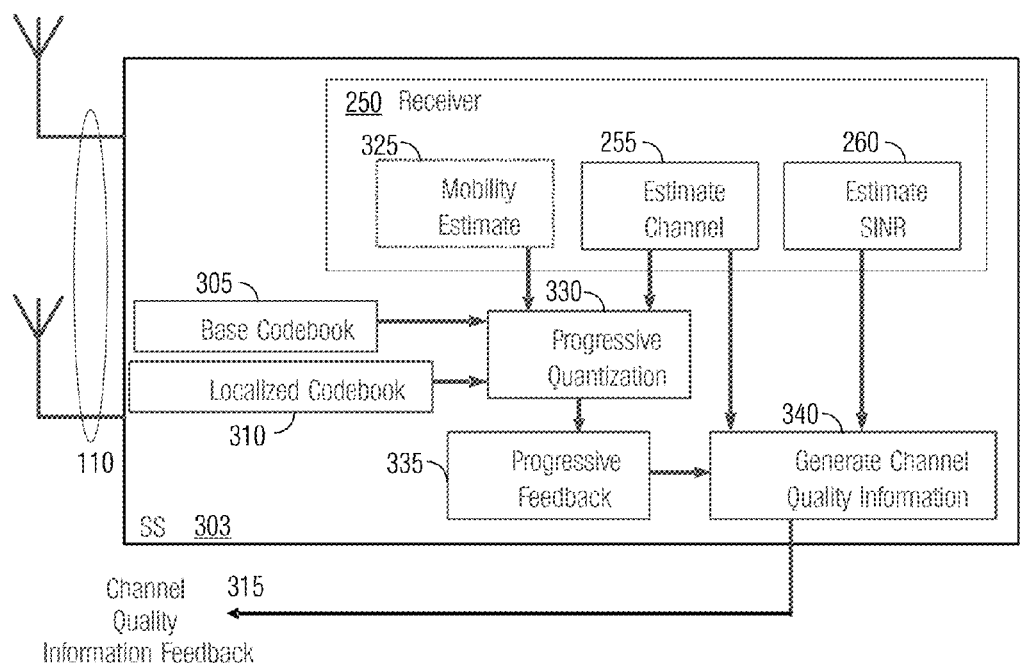
FIG. 3b is a diagram of a subscriber unit.

FIG. 3b illustrates subscriber unit 303. Subscriber unit 303 may have one or more receive antennas 110, connecting through RF circuitry to a receiver signal processing block 250. Some of the key functions performed by receiver signal processing block 250 include channel estimation block 255, estimate SINR block 260, and a mobility estimate block 325.

Channel state information is quantized using a progressive quantization block 330 as described in the embodiments. Progressive quantization block 330 first quantizes the received signal to a base codebook 305 then generates at least one successive refinement using a localized codebook 310. With each progressive refinement, localized codebook 310 becomes more localized resulting in a more efficient quantization. An index from the base codebook and several indices from the localized codebook are output from progressive quantization block 330. An estimate of the amount of channel variation, produced by mobility estimate block 325, may be used to improve the progressive quantization algorithm by initializing the algorithm from a previous quantization level or adjusting the amount of localization.

Progressive feedback block 335 generates a new feedback message by combining the base and localized codebook indices output from progressive quantization block 330. Generate channel quality information block 340 generates a special feedback control message employing the outputs of progressive feedback block 335 to produce channel quality information feedback 315.

Channel estimation block 255 may employ any number algorithms known in the art including least squares, maximum likelihood, maximum a postiori, Bayes estimator, adaptive estimator, or a blind estimator. Some algorithms exploit known information inserted into the transmit signal in the form of training signals, training pilots, while others use structure in the transmitted signal such as cyclostationarity to estimate coefficients of the channel between the BTS and the subscriber unit.

Estimate SINR block 260 outputs some measure of performance corresponding to the desired signal. In one embodiment this consists of a received signal power to interference plus noise estimate. In another embodiment, it provides an estimate of the received signal-to-noise ratio. In yet another embodiment, it provides an estimate of the average received signal power, averaged over subcarriers in an OFDM system.

Although the discussion focuses on progressive quantization block 330 and the use of base codebook 305 and localized codebook 310, it is obvious to those of ordinary skill in the art that subscriber unit 303 may also use a single codebook in place of multiple codebooks (base codebook 305 and localized codebooks 310) without modification. For example, progressive quantization block 330 may quantize the received signal to only base codebook 305. Progressive quantization block 330 may output an index from base codebook 305. Progressive feedback block 335 generates a new feedback message from only the index of base codebook 305. Operation of subscriber unit 303 may continue as described above.

In general, codebook(s) for use in wireless communications systems with two (2), four (4), and eight (8) transmit antennas should be designed and selected based on performance, complexity, and a number of desirable properties, including:

Performance—with a fixed amount of feedback (typically in bits), the overall system throughput as well as average throughput for individual communications devices should be good to excellent for a wide range of communications channel conditions (including uncorrelated, correlated, and dual-polarized).

Complexity—a) with a fixed amount of feedback, it may be desired that the codebook design minimizes the amount of codebook searching, and b) a codebook with the constant modulus (CM) property may be desired to avoid (or reduce) the use of matrix multiplications.

Power amplifier balance—a codebook with the CM property may be desired to avoid (or reduce) transmission power imbalance.

Feedback overhead—a codebook design that supports differential feedback to reduce overall feedback overhead may be desired.

Flexibility to extend to other MIMO scenarios—a codebook design should cover both SU-MIMO and MU-MIMO, which typically requires different sizes of codebooks.

As discussed above, a codebook with the CM property (simply, a CM codebook) may help to avoid transmit power imbalance in MIMO wireless communications systems as well as reduce computational complexity by reducing (or eliminating) the use of matrix multiplications. However, many well-known codebook design criteria, such as, Grassmannian link packing and progressive codebook design, may not always be able to create a CM codebook.

Figures 4, 5C:
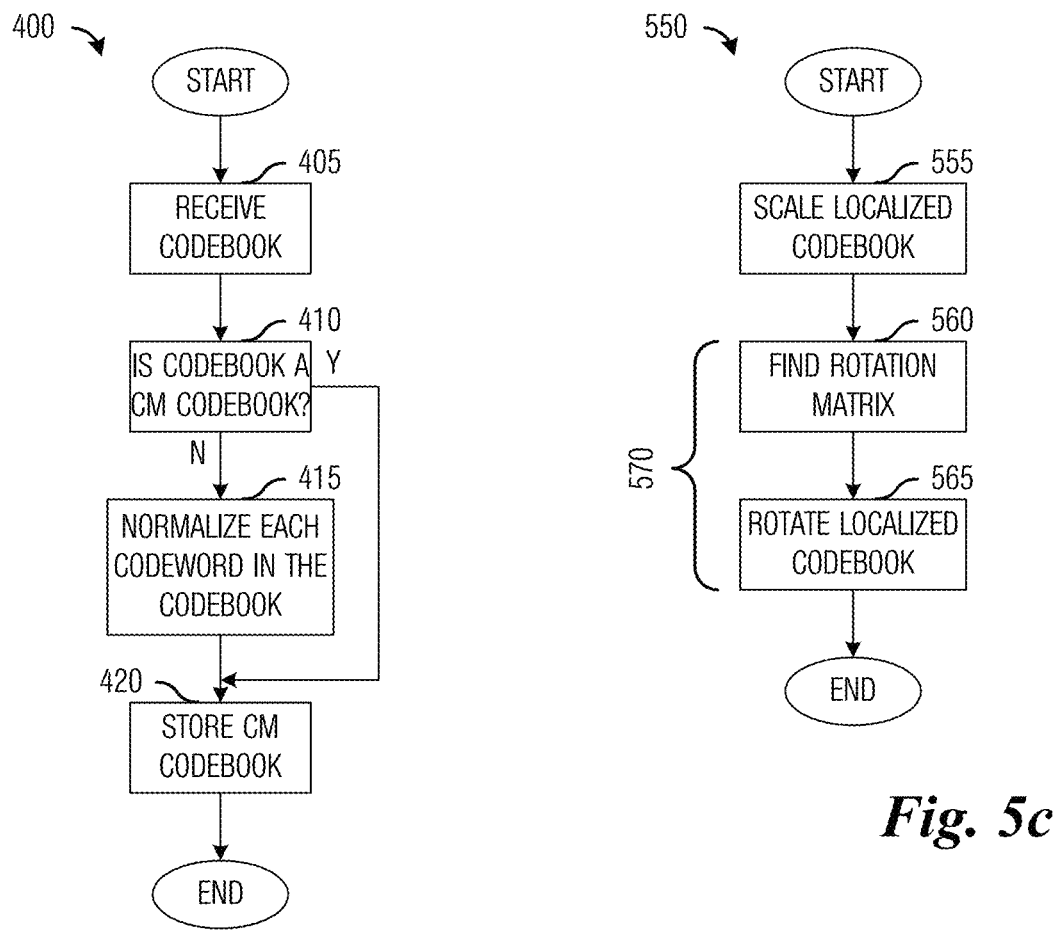
FIG. 4 is a flow diagram of operations in CM codebook generation.
FIG. 5c is a flow diagram of operations in adjusting a localized codebook.

FIG. 4 illustrates a flow diagram of operations 400 in CM codebook generation. Operations 400 may be indicative of operations taking place in a codebook generator and the resulting CM codebook(s) may be stored in BTS and subscriber units for subsequent use. Alternatively, operations 400 may occur in a processing unit of a BTS to create CM codebook(s) for use by the BTS and subscriber units served by the BTS. Operations 400 may occur to generate the CM codebook(s) and may be repeated if a need for additional CM codebook(s) arises.

Operations 400 may begin with the codebook generator receiving a codebook (or codebooks) (block 405). The codebook may have been stored, in a memory or some other storage media, for example, and retrieved for processing. For example, the codebook generator may have generated the codebook in an earlier operation.

The codebook generator may then perform a check to determine if the codebook has the CM property (block 410). Let the codebook be represented as:

$$C=\{c_{i,j}\},\ i\in[1,\ldots,N_t];\ j\in[1,\ldots,N],$$

where $N_t$ denotes the number of transmit antennas and $N$ represents the number of codewords in the codebook. Consequently, $C_{i,j}$ is the i-th element of the j-th codeword.

The codebook may have the CM property if for each $C_{i,j}$, $$|c_{i,j}|^2 = \frac{1}{N_t}.$$

Conversely, if $$|c_{i,j}|^2 \neq \frac{1}{N_t}$$

for one $C_{i,j}$ then the codebook does not have the CM property.

If the codebook does not have the CM property, then it is possible to convert the codebook so that it does have the CM property by normalizing the codewords in the codebook (block 415). The normalized codebook may be expressed as:

$$\hat{C}=\{\hat{c}_{i,j}\},\ i\in[1,\ldots,N_t];\ j\in[1,\ldots,N],$$

where $$\hat{c}_{i,j} = \frac{c_{i,j}}{|c_{i,j}|}.$$

After normalizing each codeword in the codebook to convert the codebook into a codebook with the CM property or if the codebook already has the CM property, the codebook generator may store the codebook (i.e., the converted codebook or the original codebook that is already CM) to a memory or some other storage media for subsequent use (block 420). Operations 400 may then terminate.

As described previously, wireless communications system 100 may make use of progressive quantization and progressive reconstruction in conjunction with a base codebook and one or more localized codebooks to help improve the overall performance of wireless communications system 100. The base codebook and/or the localized codebooks may have the CM property to help reduce power amplifier imbalance and computational requirements.

The base codebook and the localized codebook may be collectively referred to as a combination codebook. The combination codebook comprises the base codebook and at least one localized codebook. The localized codebook may be refined over multiple stages to produce additional localized codebook. At least the base codebook may have the CM property. However, it may be preferred that the localized codebook(s) also have the CM property.

FIG. 5a illustrates a representative example of a base codebook and FIG. 5b illustrates a representative example of a localized codebook. In both FIGS. 5a and 5b, the codewords of the respective codebooks are illustrated as points, such as points 505, on a unit sphere 500. FIGS. 5a and 5b illustrate the relationship between the base codebook and the localized codebook.

A base codebook may be selected depending on various design criteria. For example, in an uncorrelated MIMO channel, a discrete Fourier transform (DFT) matrix is one of several good options in that a minimum chordal distance between codewords is maximized. A base codebook may be defined as:

$$C_{base}^M = [c_{base}^1, c_{base}^2, \ldots, c_{base}^M],$$

where M denotes the number of codewords in the base codebook.

A localized codebook, as shown in FIG. 5b, may not be uniform. With the processing (including scaling and rotating) of the localized codebook, elements in the localized codebook may be interpreted as a satellite codeword of the base codebook. A localized codebook may be defined as a $N_t$'N matrix expressible as:

$$C_{local}^N = [c_{local}^1, c_{local}^2, \ldots, c_{local}^N],$$

where $N_t$ is the number of transmit antenna, and N denotes the number of codewords in the localized codebook. A centroid 510 of the localized codebook may be expressed as:

$$c_{cnt} = [1, 0, \ldots, 0]_{1 \times N}^H.$$

According to a preferred embodiment, the localized codebook may have a constraint that centroid 510 has equal chordal distance from each codeword in $C_{local}^N$. As a result, the localized codebook may be rewritten as:

$$C_{local}^N = \begin{bmatrix} re^{j\theta_{11}} & re^{j\theta_{12}} & \cdots & re^{j\theta_{1N}} \\ r_{21}e^{j\theta_{21}} & r_{22}e^{j\theta_{22}} & \cdots & r_{2N}e^{j\theta_{2N}} \\ \vdots & \vdots & \ddots & \vdots \\ r_{N_t1}e^{j\theta_{N_t1}} & r_{N_t2}e^{j\theta_{N_t2}} & \cdots & r_{N_tN}e^{j\theta_{N_tN}} \end{bmatrix},$$

in which it is given that $$\sum_{i=2}^{N_t} |r_{ij}|^2 + |r|^2 = 1,$$

$j \in \{1, \ldots, N\}$ and the distance between centroid 510 and the codewords in the localized codebook is $\sqrt{1-r^2}$.

Since a single localized codebook may be used in conjunction with the base codebook, it may be necessary to adjust the localized codebook based on the codeword of the base codebook being used. FIG. 5c illustrates a flow diagram of operations 550 in adjusting the localized codebook. Operations 550 may be indicative of operations taking place in a subscriber unit as it generates a progressive quantization of channel state information derived from a received signal transmitted by the BTS. Operations 550 may also be indicative of operations taking place in a BTS as it uses progressive reconstruction to reconstruct the codewords from the indices of the base codebook and the localized codebook provided by the subscriber unit. Operations 550 may occur each time the subscriber unit performs a channel estimation to provide channel feedback information to the BTS or when the BTS receives channel feedback information from the subscriber unit.

Operations 550 may begin with a scaling of the localized codebook (block 555). The chordal distance between centroid 510 and the codewords of the localized codebook may be scaled to accommodate various operation scenarios. In a situation when the chordal distance is to be scaled to a value of $\alpha\sqrt{1-r^2}$, the scaled version of the localized codebook is expressible as:

$$C_{local}^N(\alpha) = \begin{bmatrix} \sqrt{\frac{1-\alpha^2}{(1-r^2)}}e^{j\theta_{11}} & \sqrt{\frac{1-\alpha^2}{(1-r^2)}}e^{j\theta_{12}} & \cdots & \sqrt{\frac{1-\alpha^2}{(1-r^2)}}e^{j\theta_{1N}} \\ \alpha r_{21}e^{j\theta_{21}} & \alpha r_{22}e^{j\theta_{22}} & \cdots & \alpha r_{2N}e^{j\theta_{2N}} \\ \vdots & \vdots & \ddots & \vdots \\ \alpha r_{N_t1}e^{j\theta_{N_t1}} & \alpha r_{N_t2}e^{j\theta_{N_t2}} & \cdots & \alpha r_{N_tN}e^{j\theta_{N_tN}} \end{bmatrix},$$

where $\alpha$ is the scaling factor.

Operations 550 may also include codeword rotation (blocks 560 and 565). Blocks 560 and 565 may be collectively referred to as codeword rotation (block 570). Codeword rotation (block 570) may involve rotating vector $c_{cnt}$ to the codeword $c_{base}^m$ in the base codebook, where $m \in \{1, \ldots, M\}$. By doing so, the localized codebook may also be rotated to surround $c_{base}^m$. As a result, centroid 510 of the rotated localized codebook becomes the codeword $c_{base}^m$. Specifically, the codeword rotation may be performed in a multi-stage process.

A first stage of the codeword rotation (block 560) may involve finding a rotation matrix $R^m$, by which vector $c_{cnt}$ may be rotated to vector $c_{base}^m$. The rotation matrix $R^m$ may be any unitary matrix with a constraint of $(R^m)^H c_{base}^m = c_{cnt}$. It may be obvious that $R^m c_{cnt} = c_{base}^m$, which indicates that vector $c_{cnt}$ has been rotated to vector $c_{base}^m$.

A second stage of codeword rotation (block 565) may involve rotating the localized codebook $C_{local}^N$ by the rotation matrix $R^m$. The rotated localized codebook may be denoted $$C_{local}^{(N,m)} = R^m C_{local}^N.$$

Operations 550 may then terminate.

The combination codebook, denoted $CX^{N_t,r}$, where $X = M \times N$ denotes the side of the combination codebook and $r$ is the rank, may be obtained based on the scaled and rotated localized codebooks. $CX^{N_t,r}$ may be an $N_t \times (MN)$-sized matrix and may be expressed as:

$$CX^{N_t,r} = [C_{local}^{(N,1)}, C_{local}^{(N,2)}, \ldots, C_{local}^{(N,M)}].$$

In various deployment scenarios (e.g., MU-MIMO and SU-MIMO), the required quantization accuracy (or the size of the codebook) may vary. As a result, the combination codebook $CX^{N_t,r}$ may be further refined. Specifically, $CX^{N_t,r}$ may be used as a base codebook. Then, with predefined scaling factors and a localized codebook, a new codebook may be readily obtained using the above discussed techniques.

Figure 6:
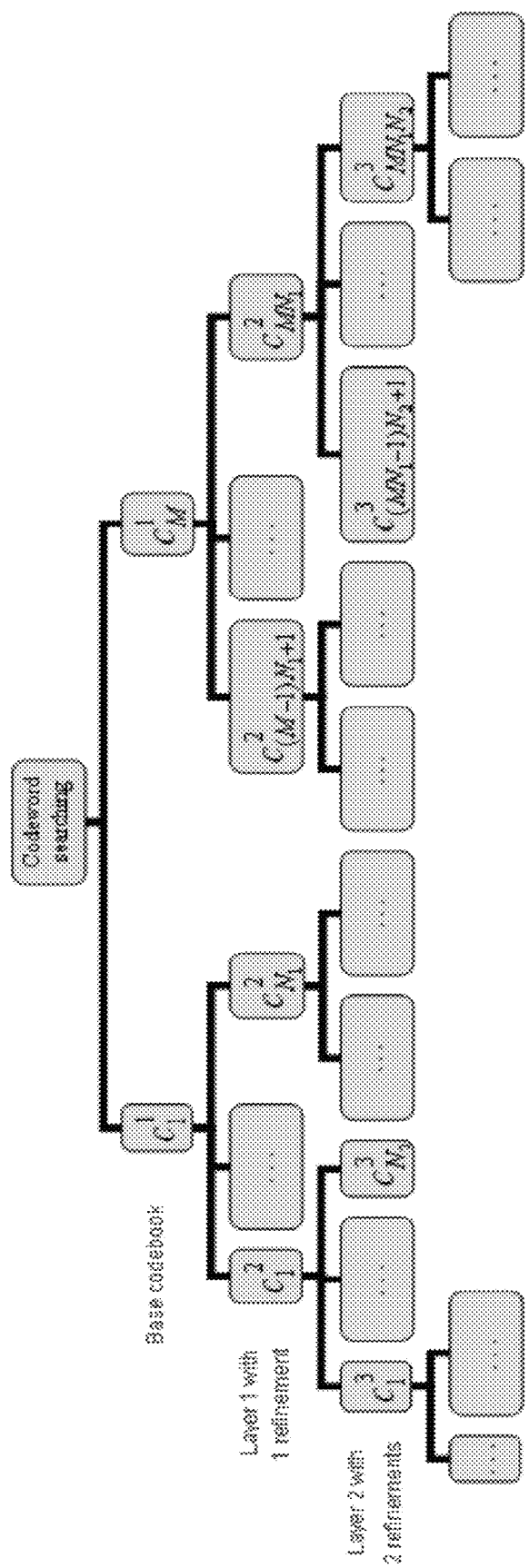
FIG. 6 is a diagram of the hierarchical structure of the combination codebook.

FIG. 6 illustrates a hierarchical structure of the combination codebook. As shown in FIG. 6, $N_i$ represents the localized codebook size associated with an i-th layer (refinement). The inherent hierarchical structure of the combination codebook may both simplify the searching for codewords as well as differential feedback.

Codeword searching may be simplified by the hierarchical structure of the combination codebook. Specifically, in a layer, only the nodes which are associated with the selected nodes in a higher layer are considered. Consequently, for a combination codebook with $N_{layer}$ layers, the number of searched codewords is $$M + \sum_{i=1}^{N_{layer}} N_i.$$

Compared to a conventional codebook of the same size, $$M \prod_{i=1}^{N_{layer}} N_i$$

codewords would be searched. Clearly, the codeword searching complexity is significantly reduced when combination codebooks are used.

Differential feedback is also supported by the hierarchical structure of the combination codebook. The nodes associated with a mother node in a higher level will systematically have higher correlations and be nearer to each other in the vector space. This may readily facility the differential feedback and therefore reduces feedback overhead. For example, in a first feedback, an index to the base codebook of the combination codebook is fed back. Then in a second feedback, an index to a first refinement of the localized codebook of the combination codebook is fed back instead of both the index of the base codebook and the index of the first refinement of the localized codebook. In general, in an l-th feedback, an index to an (l−1)-th refinement of the localized codebook is fed back instead of a complete set of indices.

An exemplary combination codebook for a MIMO wireless communications system with four transmit antennas is provided below:

$$\text{Base codebook: } C_{base}^4 = \frac{1}{2} \times \begin{bmatrix} -1 & -1 & j & -j \\ j & j & -1 & 1 \\ j & -j & -1 & -1 \\ 1 & -1 & -j & -j \end{bmatrix}$$

$$\text{Localized codebook: } C_{local}^4 = \frac{1}{2} \times \begin{bmatrix} 1 & 1 & 1 & 1 \\ 1 & -j & -1 & j \\ 1 & -1 & 1 & -1 \\ 1 & j & -1 & -j \end{bmatrix}$$

$$\text{Scaling factor: } \alpha = \frac{\sqrt{2}}{4}$$

Four-bit rank one combination codebook for four transmit antennas with the CM property $$C16^{4,1} = [c16_1^{4,1}, c16_2^{4,1}, \ldots, c16_{16}^{4,1}]$$

$$[c16_1^{4,1}, c16_2^{4,1}, c16_3^{4,1}, c16_4^{4,1}] = \begin{pmatrix} -0.5 & -0.5j & -0.2151-0.4514j & 0.2151+0.4514j \\ -0.5 & 0.1536-0.4758j & -0.5j & 0.4758-0.1536j \\ -0.4514-0.2151j & -0.2151-0.4514j & -0.5j & 0.5 \\ -0.4758+0.1536j & -0.5j & 0.1536-0.4758j & 0.5 \end{pmatrix}$$

$$[c16_5^{4,1}, c16_6^{4,1}, c16_7^{4,1}, c16_8^{4,1}] = \begin{pmatrix} -0.5 & -0.5j & -0.2151-0.4514j & 0.4514+0.2151j \\ 0.5j & -0.4758-0.1536j & -0.5 & -0.1536-0.4578j \\ 0.4514+0.2151j & 0.2151+0.4514j & 0.5j & -0.5 \\ -0.1536-0.4758j & 0.5 & 0.4758+0.1536j & 0.5j \end{pmatrix}$$

$$[c16_9^{4,1}, c16_{10}^{4,1}, c16_{11}^{4,1}, c16_{12}^{4,1}] = \begin{pmatrix} -0.5 & -0.5j & -0.2151-0.4514j & 0.4514+0.2151j \\ 0.5 & -0.1536+0.4758j & 0.5j & -0.4758+0.1536j \\ -0.4514-0.2151j & -0.2151-0.4514j & -0.5j & 0.5 \\ 0.4758-0.1536j & 0.5j & -0.1536+0.4758j & -0.5 \end{pmatrix}$$

$$[c16_{13}^{4,1}, c16_{14}^{4,1}, c16_{15}^{4,1}, c16_{16}^{4,1}] = \begin{pmatrix} -0.5 & -0.5j & -0.2151-0.4514j & 0.4514+0.2151j \\ -0.5j & 0.4578+0.1536j & 0.5 & 0.1536+0.4758j \\ 0.4514+0.2151j & 0.2151+0.4514j & 0.5j & -0.5 \\ 0.1536+0.4758j & -0.5 & -0.4758-0.1536j & -0.5j \end{pmatrix}$$

Figure 7:
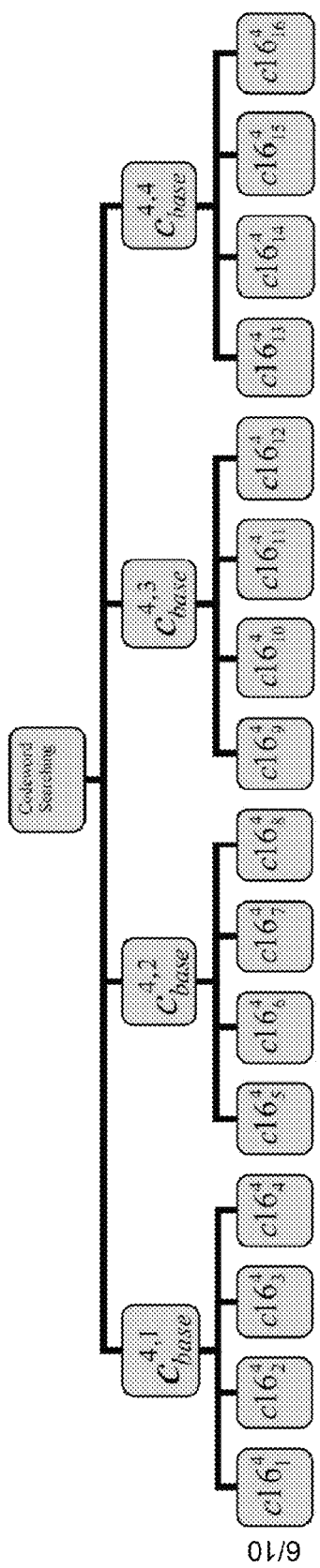
FIG. 7 is a diagram of codeword searching for the combination codebook for a MIMO wireless communications system with four transmit antennas.

FIG. 7 illustrates a diagram of codeword searching for the combination codebook for a MIMO wireless communications system with four transmit antennas. The number of codewords searched is decreased by 50% from 16 codewords down to eight (8) codewords.

Three-bit rank one combination codebook for four transmit antennas with the CM property $$C8^{4,2} = [c8_1^{4,2}, c_2^{4,2}, \ldots, c8_{16}^{4,2}]$$

| $c8_1^{4,2}$ | $c8_2^{4,2}$ | $c8_3^{4,2}$ | $c8_4^{4,2}$ |
|---|---|---|---|
| $[c16_1^4, c16_5^4]$ | $[c16_2^4, c16_6^4]$ | $[c16_3^4, c16_7^4]$ | $[c16_4^4, c16_8^4]$ |
| $c8_5^{4,2}$ | $c8_6^{4,2}$ | $c8_7^{4,2}$ | $c8_8^{4,2}$ |
| $[c16_9^4, c16_{13}^4]$ | $[c16_{10}^4, c16_{14}^4]$ | $[c16_{11}^4, c16_{15}^4]$ | $[c16_{12}^4, c16_{16}^4]$ |

Three-bit rank four combination codebook for four transmit antennas with the CM property $$C4^{4,4} = [c4_1^{4,4}, c4_2^{4,4}, \ldots, c4_4^{4,4}]$$

| $c4_1^{4,4}$ | $c4_2^{4,4}$ | $c4_3^{4,4}$ | $c4_4^{4,4}$ |
|---|---|---|---|
| $[c8_1^{4,2}, c8_5^{4,2}]$ | $[c8_2^{4,2}, c8_6^{4,2}]$ | $[c8_3^{4,2}, c8_7^{4,2}]$ | $[c8_4^{4,2}, c8_8^{4,2}]$ |

Figure 8A:
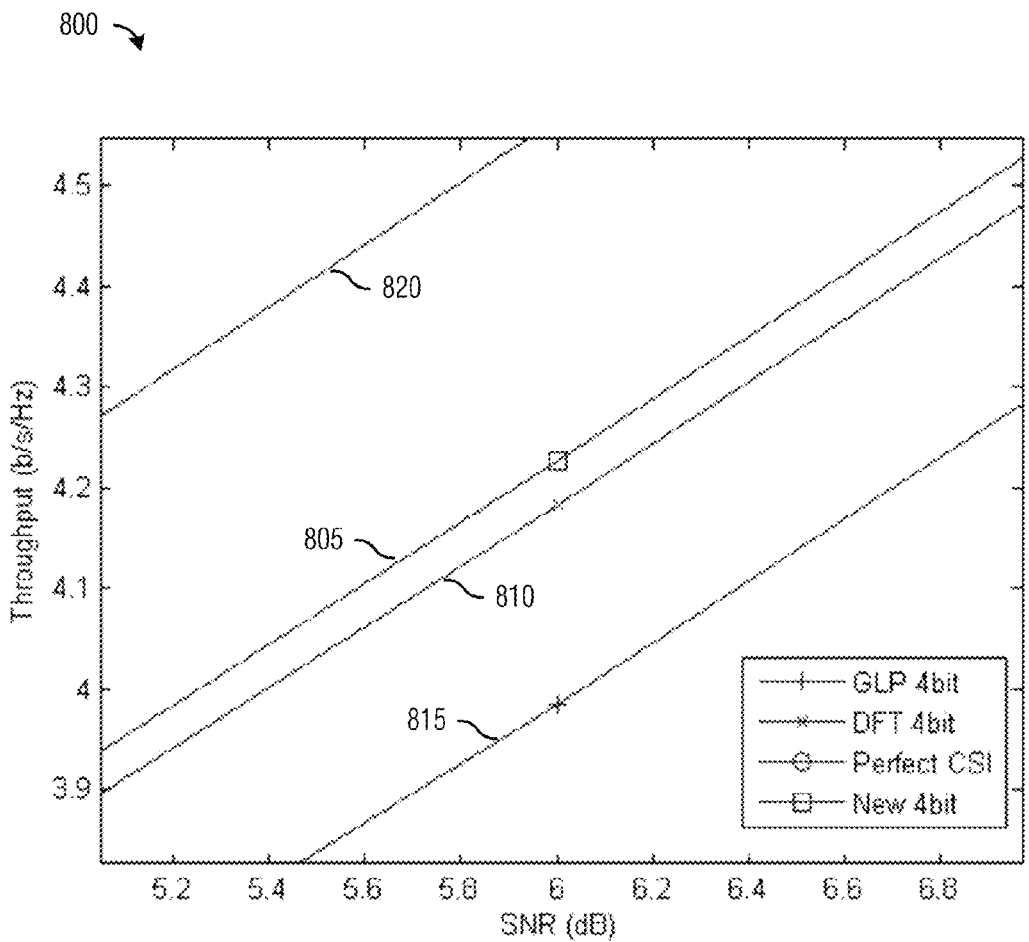
FIG. 8*a* is a data plot of system throughput for a range of signal-to-noise ratios for several different codebooks for a MIMO communications system with four transmit antenna and two receive antenna and a first traffic model.

FIG. 8a illustrates a data plot 800 of system throughput for a range of signal-to-noise ratios for several different codebooks for a MIMO communications system with four transmit antenna and two receive antenna and a first traffic model. A first trace 805 illustrates the performance of a combination codebook as disclosed above, a second trace 810 illustrates the performance of a DFT based codebook, and a third trace 815 illustrates the performance of a Grassmannian link packing (GLP) based codebook. First trace 805 shows that the performance of the combination codebook is superior to that of DFT- and GLP-based codebooks and is only exceeded by an ideal MIMO communications system with perfect channel state information (shown as a fourth trace 820).

Figure 8B:
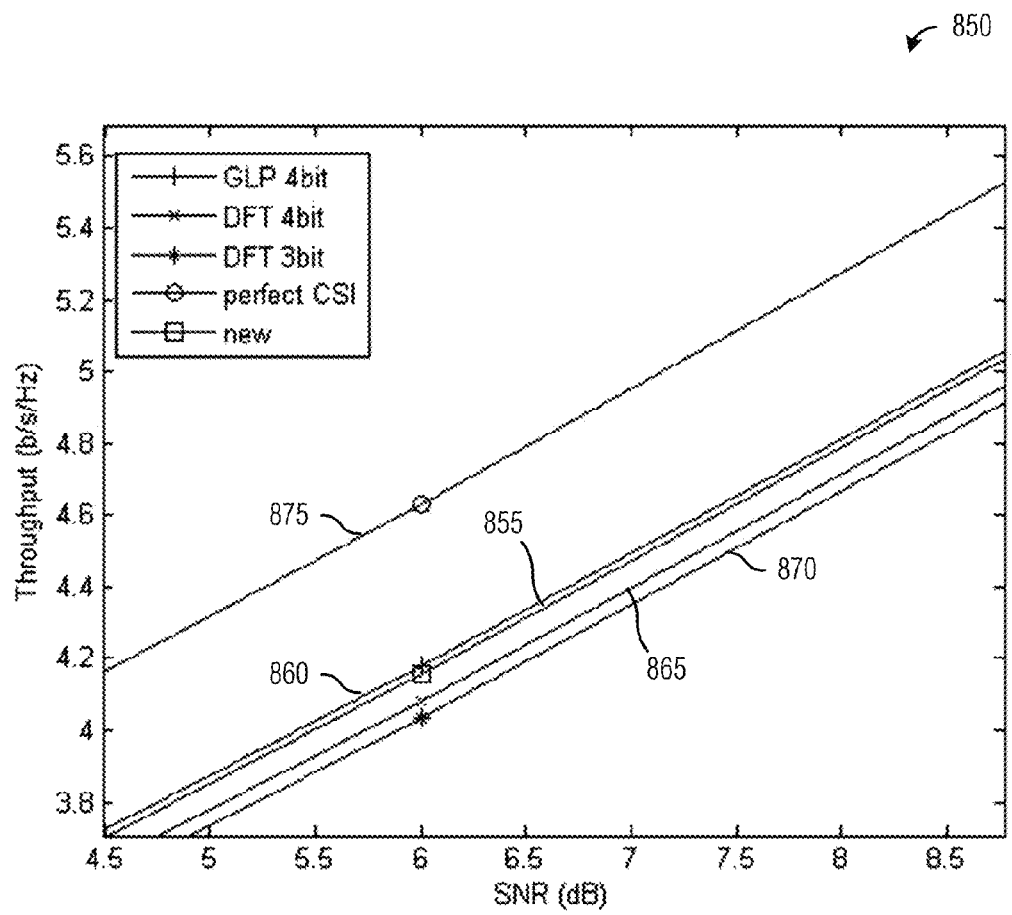
FIG. 8*b* is a data plot of system throughput for a range of signal-to-noise ratios for several different codebooks for a MIMO communications system with four transmit antenna and two receive antenna and a second traffic model.

FIG. 8b illustrates a data plot 850 of system throughput for a range of signal-to-noise ratios for several different codebooks for a MIMO communications system with four transmit antenna and two receive antenna and a second traffic model. A first trace 855 illustrates the performance of a combination codebook as disclosed above, a second trace 860 illustrates the performance of a GLP based codebook with a four bit index, a third trace 865 illustrates the performance of a DFT based codebook with a four bit index, and a fourth trace 870 illustrates the performance of a DFT based codebook with a three bit index. First trace 855 shows that the performance of the combination codebook is similar to that of GLP based codebooks with a four bit index and superior to either four bit index or three bit index DFT based codebooks. Again, first trace 855 is surpassed by an ideal MIMO communications system with perfect channel state information (shown as a fifth trace 875).

An exemplary combination codebook for a MIMO wireless communications system with two transmit antennas is provided below:

Base codebook: $C_{base}^2 = \frac{\sqrt{2}}{2} \times \begin{bmatrix} 1 & 1 & 1 & 1 \\ e^{\frac{\pi}{8}j} & e^{\frac{5\pi}{8}j} & e^{\frac{3\pi}{8}j} & e^{\frac{7\pi}{8}j} \end{bmatrix}$ Localized codebook: $C_{local}^2 = \frac{\sqrt{2}}{2} \times \begin{bmatrix} 1.3604 - 0.2706j & 1.3604 + 0.2706j \\ 0.0538 + 0.2706j & 0.0538 - 0.2706j \end{bmatrix}$ Scaling factor: $\alpha = \frac{\sqrt{2}}{2}$ Two-bit rank four combination codebook for two transmit antennas with the CM property $C8^{2,1} = [c8_1^{2,1}, c8_2^{2,1}, \ldots, c8_8^{2,1}]$

| $c8_1^{2,1}$ | $c8_2^{2,1}$ | $c8_3^{2,1}$ | $c8_4^{2,1}$ | $c8_5^{2,1}$ | $c8_6^{2,1}$ | $c8_7^{2,1}$ | $c8_8^{2,1}$ |
|---|---|---|---|---|---|---|---|
| $[1, 1]$ | $[1, e^{\frac{\pi}{4}j}]$ | $[1, j]$ | $[1, e^{\frac{3\pi}{4}j}]$ | $[1, -1]$ | $[1, e^{\frac{\pi}{4}j}]$ | $[1, -j]$ | $[1, e^{\frac{3\pi}{4}j}]$ |

Three-bit rank two combination codebook for two transmit antennas with the CM property $C4^{2,2} = [c4_1^{2,2}, c4_2^{2,2}, \ldots, c4_4^{2,2}]$

| $c4_1^{2,2}$ | $c4_2^{2,2}$ | $c4_3^{2,2}$ | $c4_4^{2,2}$ |
|---|---|---|---|
| $c8_1^{2,1}, c8_5^{2,1}$ | $c8_2^{2,1}, c8_8^{2,1}$ | $c8_3^{2,1}, c8_7^{2,1}$ | $c8_4^{2,1}, c8_6^{2,1}$ |

Figure 9A:
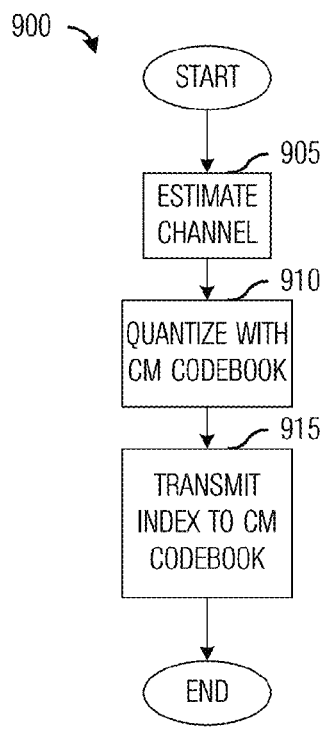
FIGS. 9*a* and 9*b* are flow diagrams of subscriber unit operations in generating channel quality information feedback.

FIG. 9a illustrates a flow diagram of subscriber unit operations 900 in generating channel quality information feedback. Subscriber unit operations 900 may begin with the estimating of the channel to produce a channel estimate (block 905). The estimating of the channel may be performed by estimate channel block 255. After estimating the channel, the channel estimate may be quantized using a CM codebook (block 910). The channel estimate may also be normalized prior to being quantized. Then, an index of a codeword in the CM codebook may be transmitted to a BTS serving the subscriber unit. Subscriber unit operations 900 may then terminate.

Figure 9B:
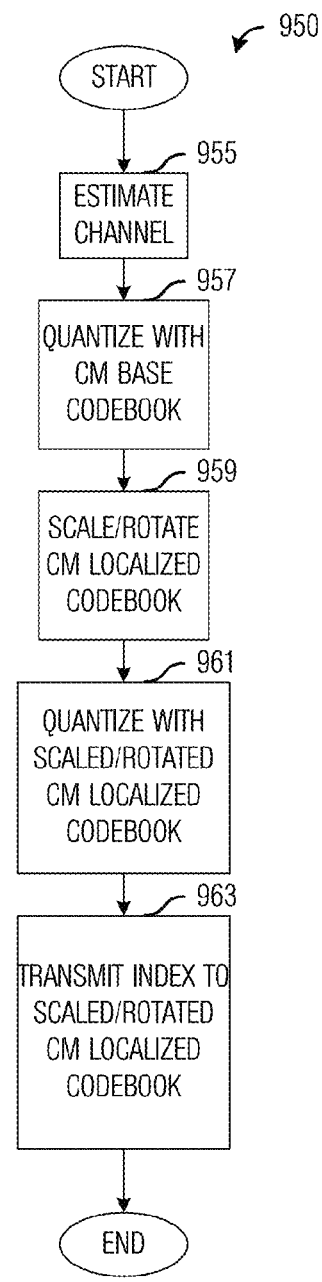

FIG. 9b illustrates a flow diagram of subscriber unit operations 950 in generating channel quality information feedback. Subscriber unit operations 950 may begin with the estimating of the channel to produce a channel estimate (block 955). The estimating of the channel may be performed by estimate channel block 255. After estimating the channel, the channel estimate may be quantized using a CM base codebook (block 957). This may produce an index to the CM base codebook. The channel estimate may be normalized prior to being quantized.

Then, a CM localized codebook may be scaled and rotated based on vector $c_{cnt}$ (block 959). The scaled and rotated CM localized codebook may then be used to quantize the channel estimate (block 961). This may produce an index to the scaled/quantized CM localized codebook. The indices (the index to the CM base codebook and the index to the scaled/quantized CM localized codebook) may be transmitted to a BTS serving the subscriber unit. Subscriber unit operations 900 may then terminate.

Generally, the scaling and rotating of the CM localized codebook may be performed multiple times, with each time adding to the refinement of the quantization of the channel estimate. Therefore, although the discussion focuses on a single scaling and rotating of the CM localized codebook, subscriber unit operations 950 may be readily modified to perform multiple scaling/rotating operations on the CM localized codebook.

Figures 10A, 10B:
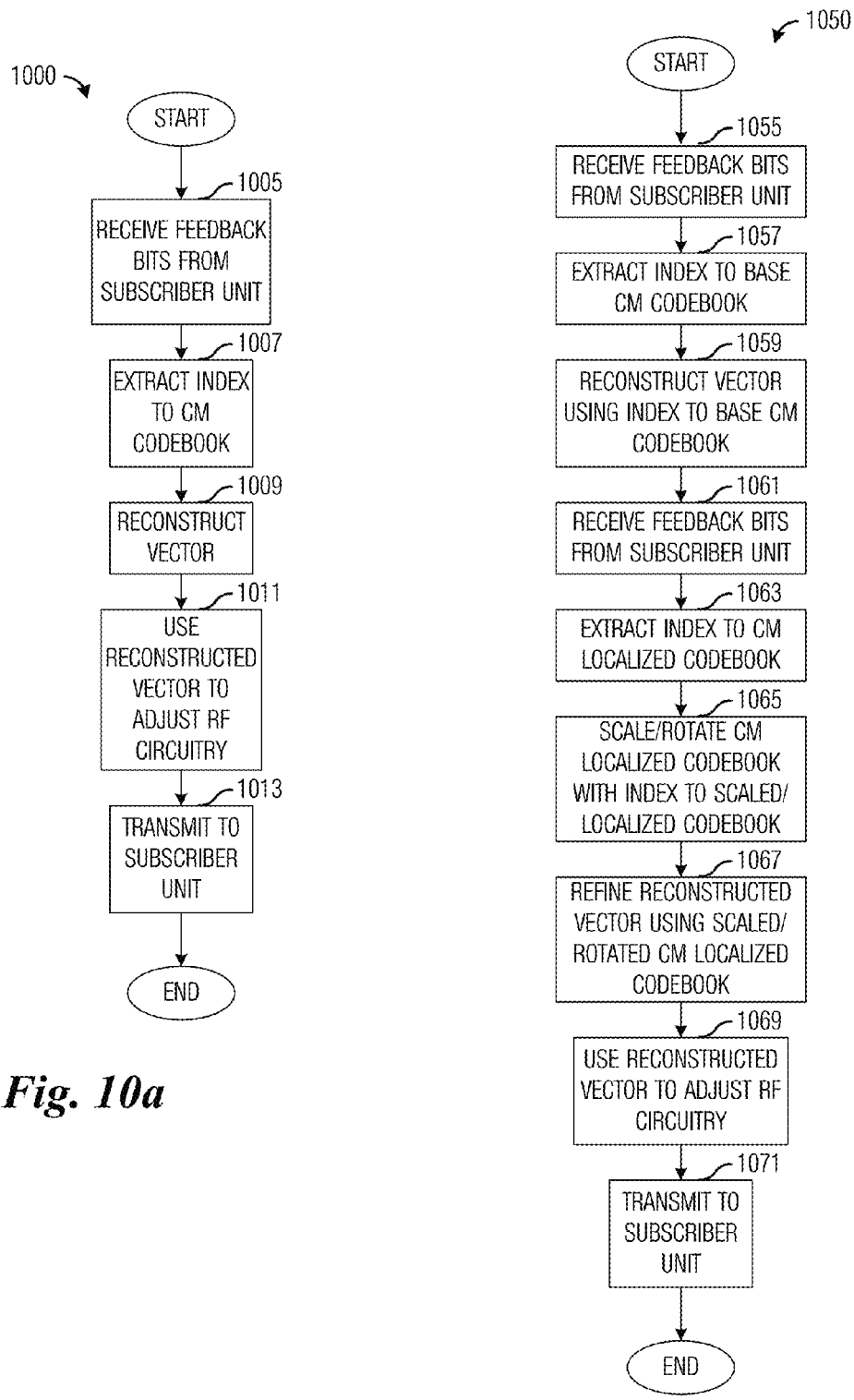
FIGS. 10*a* and 10*b* are flow diagram of BTS operations in transmitting information to a subscriber unit using channel quality information feedback provided by the subscriber unit.

FIG. 10a illustrates a flow diagram of BTS operations 1000 in transmitting information to a subscriber unit using channel quality information feedback provided by the subscriber unit. BTS operations 1000 may begin receiving channel quality information feedback (or feedback bits) from a subscriber unit (block 1005). From the channel quality information feedback, a index to a CM codebook may be extracted (block 1007). The index to the CM codebook may be used to reconstruct a channel estimate vector (block 1009). The channel estimate vector may be used to adjust radio frequency (RF) hardware in the BTS (block 1011) and the BTS may make use of the adjusted RF hardware to transmit to the subscriber unit (block 1013). BTS operations 1000 may then terminate.

FIG. 10b illustrates a flow diagram of BTS operations 1050 in transmitting information to a subscriber unit using channel quality information feedback provided by the subscriber unit. BTS operations 1050 may begin with the BTS receiving channel quality information feedback (or feedback bits) from a subscriber unit (block 1055). From the channel quality information feedback, a index to a CM base codebook may be extracted (block 1057). The index to the CM codebook may be used to reconstruct a channel estimate vector (block 1059).

The BTS may also receive additional channel quality information feedback from the subscriber unit (block 1061). From the channel quality information feedback, an index to a CM localized codebook may be extracted (block 1063). The index to the CM localized codebook may be used in a scaling and rotating of the CM localized codebook (block 1065) and the reconstructed channel estimate vector may be refined using the scaled/rotated CM localized codebook (block 1067).

The additional channel quality information feedback may be a part of the same channel quality feedback used to provide the index to the CM codebook. Alternatively, the additional channel quality information feedback may be sent to the BTS in a different feedback transmission.

The refined channel estimate vector may be used to adjust radio frequency (RF) hardware in the BTS (block 1069) and the BTS may make use of the adjusted RF hardware to transmit to the subscriber unit (block 1071). BTS operations 1050 may then terminate.

Generally, the scaling and rotating of the CM localized codebook may be performed multiple times. As the BTS continues to receive indices for the CM localized codebook (in channel quality information feedback transmissions), the BTS may continue to refine the reconstructed channel estimate vector rather than starting over again with the CM base codebook. Therefore, although the discussion focuses on a single scaling and rotating of the CM localized codebook, BTS operations 1050 may be readily modified to perform multiple scaling/rotating operations on the CM localized codebook from the channel quality information feedback.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for operating in a communications network, the method comprising:
   receiving a codebook, the codebook comprising a plurality of codewords;
   determining if the codebook satisfies a constant modulus property;
   when the codebook does satisfy the constant modulus property, storing the codebook;
   when the codebook does not satisfy the constant modulus property, converting the codebook to obtain a converted codebook that satisfies the constant modulus property and storing the converted codebook, wherein converting the codebook to obtain the converted codebook that satisfies the constant modulus property comprises dividing each codeword in the codebook by the codeword's magnitude; and
   prompting a transmission to a communications device, wherein the transmission is encoded using a codeword in the stored codebook.

2. The method of claim 1, wherein determining if the codebook satisfies the constant modulus property further comprises determining that the codebook satisfies the constant modulus property when $$|c_{i,j}|^2 = \frac{1}{N_t}$$

for all i and j, where $c_{i,j}$ is an i-th element of a j-th codeword in the codebook, $|c_{i,j}|$ returns the magnitude of codeword $c_{i,j}$, and $N_t$ is a number of transmit antenna in the communications network.

3. The method of claim 1, wherein determining if the codebook satisfies the constant modulus property further comprises determining that the codebook does not satisfy the constant modulus property when $$|c_{i,j}|^2 \neq \frac{1}{N_t}$$

for any codeword in the codebook.

4. The method of claim 1, wherein the codebook comprises a base codebook and a localized codebook, wherein the communications network is a multiple input, multiple output communications network with four transmit antennas, and wherein the base codebook is expressible as $$C_{base}^4 = \frac{1}{2} \times \begin{bmatrix} -1 & -1 & j & -j \\ j & j & -1 & 1 \\ j & -j & -1 & -1 \\ 1 & -1 & -j & -j \end{bmatrix},$$

the localized codebook is expressible as $$C_{local}^4 = \frac{1}{2} \times \begin{bmatrix} 1 & 1 & 1 & 1 \\ 1 & -j & -1 & j \\ 1 & -1 & 1 & -1 \\ 1 & j & -1 & -j \end{bmatrix},$$

a scaling factor is expressible as $$\alpha = \frac{\sqrt{2}}{4},$$

and a four-bit rank one codebook with a constant modulus property is expressible as $$C16^{4,1} = [c16_1^{4,1}, c16_2^{4,1}, \ldots, c16_{16}^{4,1}],$$

where $$[c16_1^{4,1}, c16_2^{4,1}, c16_3^{4,1}, c16_4^{4,1}] = \begin{pmatrix} -0.5 & -0.5j & -0.2151 - 0.4514j & 0.2151 + 0.4514j \\ -0.5 & 0.1536 - 0.4758j & -0.5j & 0.4758 - 0.1536j \\ -0.4514 - 0.2151j & -0.2151 - 0.4514j & -0.5j & 0.5 \\ -0.4758 + 0.1536j & -0.5j & 0.1536 - 0.4758j & 0.5 \end{pmatrix}$$

$$[c16_5^{4,1}, c16_6^{4,1}, c16_7^{4,1}, c16_8^{4,1}] = \begin{pmatrix} -0.5 & -0.5j & -0.2151 - 0.4514j & 0.4514 + 0.2151j \\ 0.5j & -0.4758 - 0.1536j & -0.5 & -0.1536 - 0.4578j \\ 0.4514 + 0.2151j & 0.2151 + 0.4514j & 0.5j & -0.5 \\ -0.1536 - 0.4758j & 0.5 & 0.4758 + 0.1536j & 0.5j \end{pmatrix}$$

$$[c16_9^{4,1}, c16_{10}^{4,1}, c16_{11}^{4,1}, c16_{12}^{4,1}] = \begin{pmatrix} -0.5 & -0.5j & -0.2151 - 0.4514j & 0.4514 + 0.2151j \\ 0.5 & -0.1536 + 0.4758j & 0.5j & -0.4758 + 0.1536j \\ -0.4514 - 0.2151j & -0.2151 - 0.4514j & -0.5j & 0.5 \\ 0.4758 - 0.1536j & 0.5j & -0.1536 + 0.4758j & -0.5 \end{pmatrix}$$

and

-continued $$[c16_{13}^{4,1}, c16_{14}^{4,1}, c16_{15}^{4,1}, c16_{16}^{4,1}] = \begin{pmatrix} -0.5 & -0.5j & -0.2151-0.4514j & 0.4514+0.2151j \\ -0.5j & 0.4578+0.1536j & 0.5 & 0.1536+0.4758j \\ 0.4514+0.2151j & 0.2151+0.4514j & 0.5j & -0.5 \\ 0.1536+0.4758j & -0.5 & -0.4758-0.1536j & -0.5j \end{pmatrix}.$$

5. The method of claim 1, wherein the codebook comprises a base codebook and a localized codebook, wherein the communications network is a multiple input, multiple output communications network with two transmit antennas, and wherein the base codebook is expressible as $$C_{base}^2 = \frac{\sqrt{2}}{2} \times \begin{bmatrix} 1 & 1 & 1 & 1 \\ e^{\frac{\pi}{8}j} & e^{\frac{5\pi}{8}j} & e^{\frac{3\pi}{8}j} & e^{\frac{7\pi}{8}j} \end{bmatrix},$$

the localized codebook is expressible as $$C_{local}^2 = \frac{\sqrt{2}}{2} \times \begin{bmatrix} 1.3604-0.2706j & 1.3604+0.2706j \\ 0.0538+0.2706j & 0.0538-0.2706j \end{bmatrix},$$

a scaling factor is expressible as $$\alpha = \frac{\sqrt{2}}{2},$$

and a two-bit rank four combination codebook for two transmit antennas with the constant modulus property is expressible as $$C8^{2,1} = [c8_1^{2,1}, c8_2^{2,1} \ldots, c8_8^{2,1}],$$

where $$c8_1^{2,1} = [1, 1], c8_2^{2,1} = \left[1, e^{\frac{\pi}{4}j}\right], c8_3^{2,1} = [1, j], c8_4^{2,1} = \left[1, e^{\frac{3\pi}{4}j}\right],$$

$$c8_5^{2,1} = [1, -1], c8_6^{2,1} = \left[1, e^{-\frac{\pi}{4}j}\right], c8_7^{2,1} = [1, -j], \text{ and } c8_8^{2,1} = \left[1, e^{-\frac{3\pi}{4}j}\right].$$

6. The method of claim 1, wherein the method is for subscriber unit operation, wherein the communications device is a base station, and wherein the prompting the transmission comprises:
computing an estimate of a communications channel between the subscriber unit and the base station;
quantizing the estimate with the stored codebook; and
transmitting information in accordance with the quantized estimate to the base station.

7. The method of claim 6, further comprising:
adjusting a localized codebook in accordance with the quantized estimate; and
re-quantizing the quantized estimate with the adjusted localized codebook, thereby producing a refined channel estimate.

8. The method of claim 7, wherein transmitting the information is further in accordance with the refined channel estimate.

9. The method of claim 7, wherein adjusting the localized codebook comprises scaling the localized codebook.

10. The method of claim 9, wherein scaling the localized codebook comprises scaling codewords in the localized codebook with a scaling factor.

11. The method of claim 9, wherein adjusting the localized codebook further comprises rotating the localized codebook.

12. The method of claim 11, wherein rotating the localized codebook comprises:
finding a rotation matrix; and
multiplying the localized codebook with the rotation matrix.

13. The method of claim 7, wherein the localized codebook satisfies the constant modulus property.

14. The method of claim 1, wherein the method is for base station operation, wherein the communications device is a subscriber unit, and wherein the method further comprises:
receiving channel information from the subscriber unit;
extracting a codebook index from the channel information; and
reconstructing a channel estimate using the codebook index and the stored codebook,
wherein the transmission is precoded using the reconstructed channel estimate.

15. The method of claim 14, further comprising:
extracting a localized codebook index from the channel information;
adjusting a localized codebook in accordance with the codebook index; and
further reconstructing the channel estimate using the localized codebook index and the adjusted localized codebook.

16. The method of claim 15, wherein the localized codebook satisfies the constant modulus property.

17. The method of claim 15, wherein adjusting the localized codebook comprises:
scaling the localized codebook in accordance with the codebook index; and
rotating the localized codebook in accordance with the codebook index.

18. The method of claim 14, wherein prompting the transmission comprises:
adjusting transmission circuitry in the base station using the reconstructed channel estimate;
precoding the transmission with the reconstructed channel estimate; and
transmitting the precoded transmission to the subscriber unit.

19. The method of claim 14, further comprising:
receiving a refinement channel information from the subscriber unit;
extracting a refinement localized codebook index from the refinement channel information;
adjusting a localized codebook in accordance with the codebook index; and
further reconstructing the channel estimate using the refinement localized codebook index and the adjusted localized codebook.

20. The method of claim 19, wherein the refinement channel information and the channel information are received by the base station in different feedback transmissions.

21. An apparatus comprising:
a processor; and
a computer readable storage medium storing programming for execution by the processor, the programming including instructions to:
receive a codebook, the codebook comprising a plurality of codewords;
determine if the codebook satisfies a constant modulus property;
when the codebook does satisfy the constant modulus property, store the codebook;
when the codebook does not satisfy the constant modulus property, convert the codebook to obtain a converted codebook that satisfies the constant modulus property and store the converted codebook, wherein the instructions to convert the codebook to obtain the converted codebook that satisfies the constant modulus property include instructions to divide each codeword in the codebook by the codeword's magnitude; and
prompt a transmission to a communications device, wherein the transmission is encoded using a codeword in the stored codebook.

* * * * *

UNITED STATES PATENT AND TRADEMARK OFFICE
CERTIFICATE OF CORRECTION

PATENT NO. : 8,982,867 B2
APPLICATION NO. : 13/656338
DATED : March 17, 2015
INVENTOR(S) : Yang Tang It is certified that error appears in the above-identified patent and that said Letters Patent is hereby corrected as shown below:

In the Claims

In Col. 18, claim 4, second parenthetical following "where", delete $$\text{````}[c16_5^{4,1}, c16_6^{4,1}, c16_7^{4,1}, c16_8^{4,1}] = \begin{pmatrix} -0.5 & -0.5j & -0.2151 - 0.4514j & 0.4514 + 0.2151j \\ 0.5j & -0.4758 - 0.1536j & -0.5 & -0.1536 - 0.4578j \\ 0.4514 + 0.2151j & 0.2151 + 0.4514j & 0.5j & -0.5 \\ -0.1536 - 0.4758j & 0.5 & 0.4758 + 0.1536j & 0.5j \end{pmatrix}\text{''''}$$

and insert $$\text{--}[c16_5^{4,1}, c16_6^{4,1}, c16_7^{4,1}, c16_8^{4,1}] = \begin{pmatrix} -0.5 & -0.5j & -0.2151 - 0.4514j & 0.4514 + 0.2151j \\ 0.5j & -0.4758 - 0.1536j & -0.5 & -0.1536 - 0.4758j \\ 0.4514 + 0.2151j & 0.2151 + 0.4514j & 0.5j & -0.5 \\ -0.1536 - 0.4758j & 0.5 & 0.4758 + 0.1536j & 0.5j \end{pmatrix}\text{--}$$

Signed and Sealed this
Seventh Day of July, 2015

Michelle K. Lee
*Director of the United States Patent and Trademark Office*